(12) United States Patent
Kraus

(10) Patent No.: US 10,754,862 B2
(45) Date of Patent: Aug. 25, 2020

(54) METHOD AND SYSTEM FOR SEARCHING A DATABASE HAVING DATA SETS

(71) Applicant: Omikron Data Quality GmbH, Pforzheim (DE)

(72) Inventor: Carsten Kraus, Pforzheim (DE)

(73) Assignee: Omikron Data Quality GmbH, Pforzheim (DE)

(*) Notice: Subject to any disclaimer, the term of this patent is extended or adjusted under 35 U.S.C. 154(b) by 120 days.

(21) Appl. No.: 15/575,050

(22) PCT Filed: May 18, 2016

(86) PCT No.: PCT/EP2016/061150
§ 371 (c)(1),
(2) Date: Nov. 17, 2017

(87) PCT Pub. No.: WO2016/184921
PCT Pub. Date: Nov. 24, 2016

(65) Prior Publication Data
US 2018/0143982 A1 May 24, 2018

(30) Foreign Application Priority Data
May 18, 2015 (EP) .................................... 15168040

(51) Int. Cl.
*G06F 16/30* (2019.01)
*G06F 16/2457* (2019.01)
(Continued)

(52) U.S. Cl.
CPC .. *G06F 16/24578* (2019.01); *G06F 16/90324* (2019.01); *G06F 16/951* (2019.01); *G06F 16/9535* (2019.01)

(58) Field of Classification Search
CPC .................. G06F 16/24578; G06F 16/9535
See application file for complete search history.

(56) References Cited

U.S. PATENT DOCUMENTS 6,873,982 B1 * 3/2005 Bates .................. G06F 16/3326
707/737
8,032,517 B2 10/2011 Karayel
(Continued)

FOREIGN PATENT DOCUMENTS

EP  2 035 965 B1  6/2007
WO  WO 2007/144199 A1  12/2007

OTHER PUBLICATIONS

International Search Report from corresponding International Patent Application No. PCT/EP2016/061150, dated Aug. 19, 2016.
(Continued)

*Primary Examiner* — Mahesh H Dwivedi
(74) *Attorney, Agent, or Firm* — Kusner & Jaffe

(57) ABSTRACT

A method for searching a database having data sets ($M_i$) which comprise attributes ($A^1_i$ to $A^n_i$). If a search query (S) is captured, the data sets ($M_i$) are assigned relevance data ($R^S_i$) for the search query (S) and at least one subset of the data sets ($M_i$) is output on the basis of the relevance data ($R^S_i$). Relevance data ($R^S_i$) of the data sets ($M_i$) for the search query (S) are generated with the inclusion of correlation data ($K^{S,1}$ to $K^{S,n}$) and the attributes ($A^1_i$ to $A^n_i$) of the data sets ($M_i$). A computer program having program code for carrying out the method according to the invention when the program code is executed by a computer, a search engine, and a system having a search engine.

20 Claims, 3 Drawing Sheets

(51) Int. Cl.
*G06F 16/951* (2019.01)
*G06F 16/9032* (2019.01)
*G06F 16/9535* (2019.01)

(56) References Cited

U.S. PATENT DOCUMENTS

| | | | | |
|---|---|---|---|---|
| 8,612,294 | B1* | 12/2013 | Treyz | G06Q 20/12 |
| | | | | 705/14.62 |
| 8,850,362 | B1* | 9/2014 | Khoshnevisan | G06F 16/951 |
| | | | | 715/853 |
| 2007/0106659 | A1* | 5/2007 | Lu | G06N 3/08 |
| 2008/0005313 | A1* | 1/2008 | Flake | G06Q 30/02 |
| | | | | 709/224 |
| 2008/0016101 | A1* | 1/2008 | Ginsburg | G06F 16/951 |
| 2008/0140643 | A1* | 6/2008 | Ismalon | G06F 16/24578 |
| 2008/0198012 | A1* | 8/2008 | Kamen | A61M 5/14244 |
| | | | | 340/572.1 |
| 2009/0106221 | A1* | 4/2009 | Meyerzon | G06F 16/951 |
| 2009/0171942 | A1* | 7/2009 | Suresh | G06F 16/35 |
| 2010/0114954 | A1* | 5/2010 | Sareen | G06F 16/951 |
| | | | | 707/776 |
| 2010/0299350 | A1* | 11/2010 | Konig | G06F 16/951 |
| | | | | 707/769 |
| 2012/0143852 | A1* | 6/2012 | Keohane | G06F 16/9535 |
| | | | | 707/722 |
| 2012/0239519 | A1* | 9/2012 | Wu | G06Q 30/06 |
| | | | | 705/26.3 |
| 2012/0323953 | A1 | 12/2012 | Ortega et al. | |
| 2013/0304561 | A1* | 11/2013 | Warner | G06Q 30/0226 |
| | | | | 705/14.33 |
| 2014/0188927 | A1* | 7/2014 | Moxley | G06F 16/9535 |
| | | | | 707/769 |

OTHER PUBLICATIONS

Rafael Pous et al., "Cricking: Customer-product Interaction in Retail using Pervasive Technologies," Proceedings of the 2013 ACM Conference on Pervasive and Ubiquitous Computing Adjunct Publication, UbiComp '13, Zurich Switzerland, Sep. 2, 2013, pp. 1023-1027.

* cited by examiner

METHOD AND SYSTEM FOR SEARCHING A DATABASE HAVING DATA SETS

FIELD OF THE INVENTION

The invention relates to a method for searching a database having data sets, the data sets comprising attributes. It also relates to a computer program having program code for carrying out the method according to the invention when the program code is executed by a computer. The invention also relates to a search engine for searching a database which is stored on a data storage unit and has data sets, the data sets comprising attributes. The search engine comprises a capture interface which can be used to capture a search query, a relevance determination unit which can be used to assign relevance data for the search query to the data sets, and an output unit which can be used to output at least one subset of the data sets on the basis of the relevance data. The invention also relates to a system having a search engine according to the invention.

BACKGROUND OF TH INVENTION

Searching databases for particular information is a central task of modern data processing. The larger the database, the greater the need for solutions which output the most relevant data sets in response to a search query from a user. Only in this manner can the information stored in the database be rendered optimally usable for the user. This applies particularly to catalog functions in which the data sets correspond, for example, to individual products, for example in a web shop. The user expects that precisely those products which are relevant to him will be displayed to him in response to a search query. Conversely, it is in the vital interest of a web shop owner to present the most relevant products to the user. Other examples are, for instance, library catalogs, scientific databases, reference material or files.

Nevertheless, in common search methods, the problem of irrelevant data sets being found arises, for example in the case of ambiguous search terms or because artefacts arising from the search method used occur. This results in the actually relevant hits being displayed only far down a list organized according to the determined relevance, for example, and the user not finding these hits or finding them only with difficulty. In the case of a web shop for example, such an inefficient search function leads to frustration on the part of the user and to losses in turnover for the owner.

SUMMARY OF THE INVENTION

Therefore, the object of the present invention is to provide a method, a computer program and a search engine which can be used to improve the determination of the actual relevance of data sets for a search query.

This object is achieved by means of a method having the features disclosed herein, a computer program having the features disclosed herein, a search engine having the features disclosed herein, and a system having the features disclosed herein. Advantageous configurations and developments are also disclosed herein.

In the method according to the invention, if a search query is captured, the data sets are assigned relevance data for the search query and at least one subset of the data sets is output on the basis of the relevance data. Interaction data are then captured by means of user interactions with the data sets output for the search query. Correlation data which indicate the correlation between the individual attributes and the interaction data for the search query are determined. Finally, the relevance data of the data sets for the search query are generated again with the inclusion of the correlation data and the attributes of the data sets.

This is therefore an iterative method which learns from the interaction of the user with the results of a search. The database searched contains data sets which can be assigned products, for instance. The database can therefore comprise a catalog of products, in particular. In the sense of the invention, the term "products" denotes in this case objects which are offered to the user by a provider, in particular goods and services. These may be physical objects, for instance, or else files, such as music or video files, text and images or websites, for example. In this document, a product can furthermore also be understood as meaning a group of individual products with particular properties or a group of individual products in the same product category.

Data sets which are assigned products may comprise different attributes which relate to the respective products. These may be, for example, information such as description text, categorization, product type, characteristic data, manufacturer name, product properties and prices.

In a first step, a search is carried out in the database, relevance data being assigned to the individual data sets. According to the invention, the term "relevance data" comprises those data which provide information relating to whether data sets relevant to the search query have been found and/or which data sets are relevant. Furthermore, the relevance of data sets can be quantitatively determined, for instance in order to be able to compare the relevance of different data sets. Quantitative relevance data are therefore not necessarily determined for each individual data set, but rather relevance data for the entire set or a subset of the data sets can be determined, for instance by adding data sets to a hit list without making a distinction in this case according to the degree of relevance. The relevance data may therefore also be a hit list.

It is therefore determined, for instance, which data sets are relevant to the search query, for example which products match the search query. The search results are output on the basis of the relevance, for instance in the form of a list. For example, if the relevance data comprise quantitative information relating to the relevance of the data sets, the list can be organized according to the relevance by arranging the data sets further up, the more relevant they are to the search query.

A further step captures how the user interacts with the data sets. User interaction may be effected in various ways. For example, the user may have a data set output in detailed form by activating a link on a website. He may also purchase a product assigned to a data set, may store it in a reminder list or may carry out an assessment. In this case, the user interactions are considered with respect to the search query. User interactions with those data sets which were displayed to the user when searching with this search query are therefore considered. For example, it is possible to record, that is to say store for instance, individual interaction data for the individual data sets. In this case, it is possible to record for a data set, for instance, that the user has interacted with said data set, for instance by means of a purchase, after the data set has been output in response to a particular search query. The interaction data may also be recorded in collected form, for instance as a set of the data sets with which the user has interacted after a particular search query. References to other information, for instance relating to the individual user or further search queries, can additionally improve the search.

The captured user interactions are then used to draw conclusions with regard to whether and to what extent the results of the search are relevant to the user. If, for example, a data set is displayed as very relevant and the user does not retrieve any further information relating to said data set, this may indicate that the user does not have any interest in this data set. In another example, a product is displayed as not very relevant, but is then purchased. This implies that the relevance determined in the original search should be improved.

In order to optimize the relevance data of the data sets in the search, correlation data which indicate correlations between the attributes of the data sets and the user interactions are now generated. If it is determined, for instance, that data sets with particular attributes have a particularly high or low relevance on the basis of the captured interaction data, the correlation data reflect this information. As a result, it is possible to determine, for instance, which attributes the particularly relevant or irrelevant data sets have in common. For this purpose, it is possible to use various methods of machine learning and artificial intelligence, for instance neural networks. The correlation data are used to determine the relevance of data sets for the search query in a more accurate manner on the basis of the captured interaction data. For this purpose, the relevance data of the data sets are generated again, in which case the correlation data and the attributes of the data sets are taken into account. If the search query is carried out again, more relevant results can be found as a result of the new relevance data for this search query.

In this case, the correlation data may be recorded in collected form, for instance as a correlation matrix. However, they may also be recorded with respect to the individual data sets, for example by assigning correlation data to the data set of a specific product, which correlation data comprise a correlation between user interactions with the product and search queries.

The method according to the invention is particularly advantageous in applications in which only a small amount of interaction data is available for assessing the relevance of the data sets, for example in the case of a fledgling web shop, low numbers of users or niche products. If the user has interacted only with a few data sets, for instance, generalization of the interaction data obtained therefrom by means of the attributes of the data sets also allows a more accurate determination of the relevance data for other data sets having similar attributes, for which no interaction data or only few interaction data items have been captured.

In one embodiment of the invention, differences between expected interaction data and actual interaction data are determined when determining the correlation data. This makes it possible to advantageously determine the correlation data in a particularly accurate manner.

For this purpose, expected interaction data are first of all determined. For example, a distribution of the interactions with the data sets which have been output is generated, in which distribution the user interacts most with the search results which have the highest relevance. It can be expected, for instance, that a more relevant product will be purchased more frequently than a less relevant product. If the capture of the actual interaction data provides a different result, the correlation data may be determined in such a manner that the relevance data are corrected according to the interaction data. In this case, as described above, correlations with the attributes of the data sets are taken into account. In this case, the expected interaction data may define, for example, a desired distribution in which, for instance, those products with which a particularly large number of interactions is captured are assessed as particularly relevant.

The attributes which are taken into account for the correlation data may be determined in various ways. On the one hand, all attributes may be noted, with the result that all of the attributes of the relevant data set are considered during each interaction. Furthermore, only those attributes which rarely occur in the database can be noted. For this purpose, it is possible to use a word weighting, for example, in order to identify words in product descriptions which allow a reliable characterization. In addition, the influence of different attributes, for instance particular words, on the relevance can be weighted, for instance. Furthermore, individual attributes or particular groups of attributes can be considered. For example, the name of the category of the individual data sets may be considered in isolation as an attribute in a suitable database. In this case too, the individual attributes can be weighted. In addition, only those attributes which occur in a plurality of interactions may be specifically considered in order to avoid artefacts in which the influence of a single interaction or of a few interactions is incorrectly assessed as a result of the lack of statistical significance.

In one development, the search query comprises at least one search term. As a result, the user can advantageously formulate a search query in an intuitive manner.

The search by inputting at least one search term is familiar in this case to the user, in particular for computer-based applications, and methods which are known per se and can be used to search a database on the basis of a search term are available. In this case, it is possible to analyze, for example, whether the search term is included in the attributes of the products.

In one embodiment, the search query comprises a selection of at least one search option predefined to the user. As a result, the search query can be advantageously captured quickly and easily.

Navigation headings, for instance, can be used as predefined search options. For example, the user may actuate a button on a website and may have products of a particular category displayed. This call corresponds to a search query, in which case the search parameters and search terms are already predefined to the user and the user only calls them. A "special offers" heading may also be available, for example, which heading can be called by means of a selection by the user and to which particular products are relevant. The relevance of the data sets output for the respective search option is then determined according to the invention.

Combinations of the above-described search according to search terms and predefined search options are also possible. For example, the user can search the data sets of a particular category by means of a search term. In this case, the search query is defined by all specifications which are predefined by the user.

In one development, the relevance data of the data sets for the search query are generated on the basis of a recommendation service. As a result, the search advantageously provides the user with particularly relevant data sets.

Recommendation services (recommendation engines) are known per se and can be selected and configured according to the field of application. For optimal performance of the method according to the invention, it is helpful if the first search operation on the basis of the search query already results in relevance data of the data sets which are as correct as possible and these are then optimized by the invention.

In another embodiment, the correlation data are also determined on the basis of further interaction data, the further interaction data relating to user interactions with the data sets output for a further search query. In this case, the further search query has at least a predefined degree of similarity to the search query. As a result, information relating to similar search queries is advantageously taken into account.

In particular, if free search terms are used in the search query, or else if predefined search options are used, a plurality of search queries may be similar to one another, even though they are not identical. For example, a plurality of search terms may be input in a different order, typing errors may occur or a plurality of search queries may differ as a result of minor differences. This is quantified by a degree of similarity which determines, in particular, a semantic similarity of two search queries. Furthermore, similar terms may be determined, for example, using a thesaurus, a translation dictionary, a word stem method such as stemming or lemmatization, phonetic similarity, a similarity method such as the Levenshtein distance or a method described in EP 2 035 965 B1. Interaction data which were captured in connection with similar search queries are therefore also taken into account when determining the correlation data. In particular, the data from similar search queries may be weighted in this case on the basis of the degree of similarity.

In particular, this allows relevance data which are as accurate as possible to be generated for search queries in which few or no interaction data items are available. This is important, for instance, in the case of typing errors which rarely occur and for which few interaction data items are therefore generated. However, since incorrectly and correctly written words are typically similar to one another, they have a high degree of similarity. As a result, the respective interaction data can be used to generate the correlation data and the statistical certainty can be improved by means of a larger volume of data.

Conversely, interaction data which have been captured for user interactions with incorrectly written words, for example, can also be taken into account for search queries with the correctly written word. As a result, frequent misspellings, for instance the German words "Standard" and "Standart", do not result, in particular, in the respective correlation data being determined on the basis of a reduced volume of interaction data. In both cases, the relevance of the data sets is therefore determined in a more accurate manner.

In one embodiment, the data sets in the subsets are organized during output according to a ranking which depends on the relevance data. The user therefore advantageously obtains an output of the data sets, from which he can read the relevance of the individual search results.

For example, the data sets are output in the form of a list and in this case are displayed further up in the ranking, the more relevant they are. In addition or as an alternative to the organization of the stated data sets, emphases can also be used, for example. Data sets which have a high rank can be displayed with particular emphasis, for instance. By forming the relevance data on the basis of the interaction data, the ranking can also be adapted according to the interaction data. In particular, the sorting of the search results during output therefore depends on the captured interaction data.

The search results can also be sorted according to other criteria, for example on the basis of an assigned price. This allows sorting, in particular, when the relevance of the individual data sets has not been quantified, but rather the relevance data only comprise information relating to whether or not a data set is relevant, that is to say in particular whether it belongs to the hit list. However, the sorting can also be carried out according to other criteria when quantitative relevance data have been determined for the data sets.

In one embodiment, the user interactions comprise a call for information relating to the data sets and/or reserving and/or purchasing products assigned to the data sets. This advantageously allows the particularly accurate determination of the relevance of individual data sets, in particular in web shops or in comparable fields of application.

For example, in the case of a search query on a website, a plurality of results may be displayed in a list. The user can retrieve further information relating to the data set by selecting one of the search results, for example by clicking on a product name. Such a selection is captured. More detailed information relating to the product is then output. The user can also store a data set, in particular a product, in a reminder list. The user can also purchase a product assigned to one of the data sets. In this case, the different types of interaction may be stored with the interaction data. In particular, details of the individual interactions, for example the time of an interaction or the duration of an interaction, may be stored.

In one development, the interaction data are weighted according to the type of user interactions when determining the correlation data. As a result, the different significance of different types of interaction is advantageously included in the determination of the correlation data.

For example, it is possible to differentiate how great a user's interest in a data set, in particular a product, is. For example, the purchase of a product may be given a higher weighting than the reservation of the product which in turn is given a higher rating than the retrieval of information relating to the product. The determination of the relevance data is further improved as a result.

In one embodiment, the user interactions are weighted on the basis of their frequency when determining the correlation data. As a result, the correlation data are advantageously determined in a particularly reliable manner.

In this case, it is taken into account that the frequency of particular user interactions is typically considered to be a measure of the relevance of a data set. For example, in the case of a web shop, those data sets which are assigned to products which are purchased particularly frequently in this search query are considered to be particularly relevant. In another example, in a database for a library, a data set which is called particularly frequently can be considered to be particularly relevant to the associated search query.

Conversely, a low relevance may also be determined on the basis of frequencies, for example if information relating to a product is retrieved particularly frequently without this resulting in a purchase.

In one development of the method according to the invention, the attributes comprise running text, numerical information and/or defined forms of products assigned to the data sets. As a result, the attributes advantageously allow a comprehensive description of the products.

Running text can be provided for the purpose of describing a product, for example. This running text may contain, for instance, a product name, a short description, advertising text, a book title, an author or other information. Further explanations of the product may also be stated, for example the attribute "suitable for what dishes" for wine, which attribute may contain a list in the form of running text. In case of doubt, an attribute must be classified as running text.

This requires testing and normalization routines for these attributes so that the running text can be interpreted and processed by a computer. In particular, information which makes it possible to compare a plurality of products and to determine the correlation data on the basis of the attributes must be gathered from the running text. Alternatively, words can be selected from running text. The words are then weighted. This is a simpler analysis of the running text than the testing and normalization routines already mentioned.

Numerical information can be represented by a number. This information may be, for example, price, rechargeable battery life, zoom range, release date, power consumption, volume or other data.

In the case of attributes with defined forms, the respective values of the attribute are taken from a list. This allows particularly simple categorization of products. For example, it is possible to provide lists having forms which comprise the color, size, manufacturer, product category, resolution, energy efficiency class, lamp holder or the like. It should be noted in this case that the forms often occur many times in a database, for instance a color which is assigned to many products.

The individual attributes may also be empty, that is to say no value may also have been allocated.

In one development, a user identification is carried out in conjunction with the user interactions and the search is then carried out on the basis of the data relating to the user. As a result, information relating to the respective user could be advantageously used for the search.

In this case, a user is identified according to methods known per se. For example, a user may log onto a web shop. For the search, it is then possible to use, for example, a list of the products which have been purchased by the user, have been reserved by the user or for which the user retrieved information at an earlier time. In this case, the interactions of different users can be weighted differently. An interaction, for instance a purchase, by one user can be given more or less consideration than in the case of other users, for example. The interactions can be weighted on the basis of information relating to the respectively interacting user. As a result, the relevance of the data sets for different user groups, for instance, can be better determined, for example in order to output those search results which are particularly relevant to the current user.

The computer program according to the invention comprises a program code for carrying out the method according to the invention when the program code is executed by a computer. The computer program according to the invention is designed, in particular, to implement the method according to the invention described above. The computer program therefore has the same advantages as the method according to the invention.

The search engine according to the invention of the type mentioned above is characterized in that the capture interface can also be used to capture interaction data by means of user interactions with the data sets output for the search query. The relevance determination unit can then also be used to determine correlation data which indicate the correlation between the individual attributes and the interaction data for the search query. Finally, the relevance data of the data sets for the search query can be generated again with the inclusion of the correlation data and the attributes of the data sets.

The search engine according to the invention is designed, in particular, to implement the method according to the invention described above and to execute the computer program according to the invention. It therefore has the same advantages as the method according to the invention.

In one development, a spatial proximity between a user and products assigned to the data sets can be captured during the user interactions which can be captured by the capture interface. Physical user interactions with products can therefore be advantageously captured and connected to the data sets, for instance in a shop or exhibition spaces.

For example, the position of the user can be captured, for instance by means of a camera or tracking system which locates the user. For example, the tracking can be carried out using a mobile telephone or another mobile device belonging to the user. In this manner, it is possible to determine, for instance, whether the user is in the vicinity of the product, for example in front of a particular shelf.

In another embodiment, viewing of the products assigned to the data sets by a user and/or movement of the products can be captured during the user interactions which can be captured by the capture interface. User interactions beyond the mere detection of the spatial proximity can therefore also be captured, for instance if the user takes a product from a shelf or places it in a shopping cart. In addition, a capture system, for instance, can detect that the user is specifically viewing a product. Furthermore, the spatial proximity and a physical interaction can be indirectly inferred, for instance if the user pays for a product at a checkout device. Furthermore, it is possible to capture when a user purchases a product and subsequently returns or exchanges it.

In one development, a checkout device can also be used to carry out a user identification and the correlation data are also determined on the basis of the user identification. In this case, the user can be identified, for example, by means of login data from a user device, during a cashless payment operation or by means of a customer card. As a result, a user interaction can be assigned to a particular user who has previously carried out a search with a particular search query. The user interactions can therefore be more easily assigned to the search query previously carried out and to the data sets output in the process.

In one development, signals are transmitted between the products and a device assigned to the user by means of at least one transponder during the user interactions which can be captured by the capture interface. This advantageously makes it possible to detect a physical interaction by the user. In this case, radio systems with a limited range can detect whether the user is in the spatial vicinity of products. In particular, signals can be transmitted, for example, by means of RFID ("radio frequency identification") or NFC ("near field communication").

For example, a product may comprise, in particular on its packaging, a transponder, from which the mobile telephone belonging to the user, for instance, can read signals and can identify the product. Conversely, the position of the user can be captured on the basis of a transponder, for example in the user's customer card or on his shopping cart. Furthermore, both the product and the user can be identified on the basis of transponders, for example by means of a suitable reading device at a particular position in an exhibition space, on a shopping cart or on a checkout device. The features of the user interaction captured in this manner may comprise, for instance, the identification of the product, the transmitted signal and the time and location of the transmission.

In particular, all of the user interactions captured by the capture interface may comprise both physical and virtual interactions between a user and products. For example, both the behavior of the user on a website and the behavior of the user in a shop can be used to determine or change the relevance data of the products. For example, the relevance of data sets which are output on the website in response to a search query may depend on how often the products assigned to the data sets are then purchased by the users in the shop. As a result, the relevance of the products to the user can be advantageously determined in a more accurate manner.

In one embodiment of the search engine according to the invention, the user interactions which can be captured by the capture interface comprise a call for information relating to the data sets and/or reserving and/or purchasing products assigned to the data sets. As a result, it is possible to advantageously capture the products with which the user has interacted in a particularly significant way.

The system according to the invention comprises a search engine of the type described above and an interaction capture unit. In this case, the interaction capture unit can be used to capture interactions between a user and products. A data connection can also be established between the interaction capture unit and the capture interface, and data relating to the captured interactions can be transmitted from the interaction capture unit to the capture interface of the search engine.

In particular, the interaction capture unit can be used to capture physical and/or virtual interactions.

The system according to the invention is designed, in particular, to operate the search engine according to the invention described above. It therefore has the same advantages as the search engine according to the invention.

BRIEF DESCRIPTION OF THE DRAWINGS

The invention is now explained on the basis of exemplary embodiments with reference to the drawings.

DETAILED DESCRIPTION OF THE INVENTION

Figure 1:
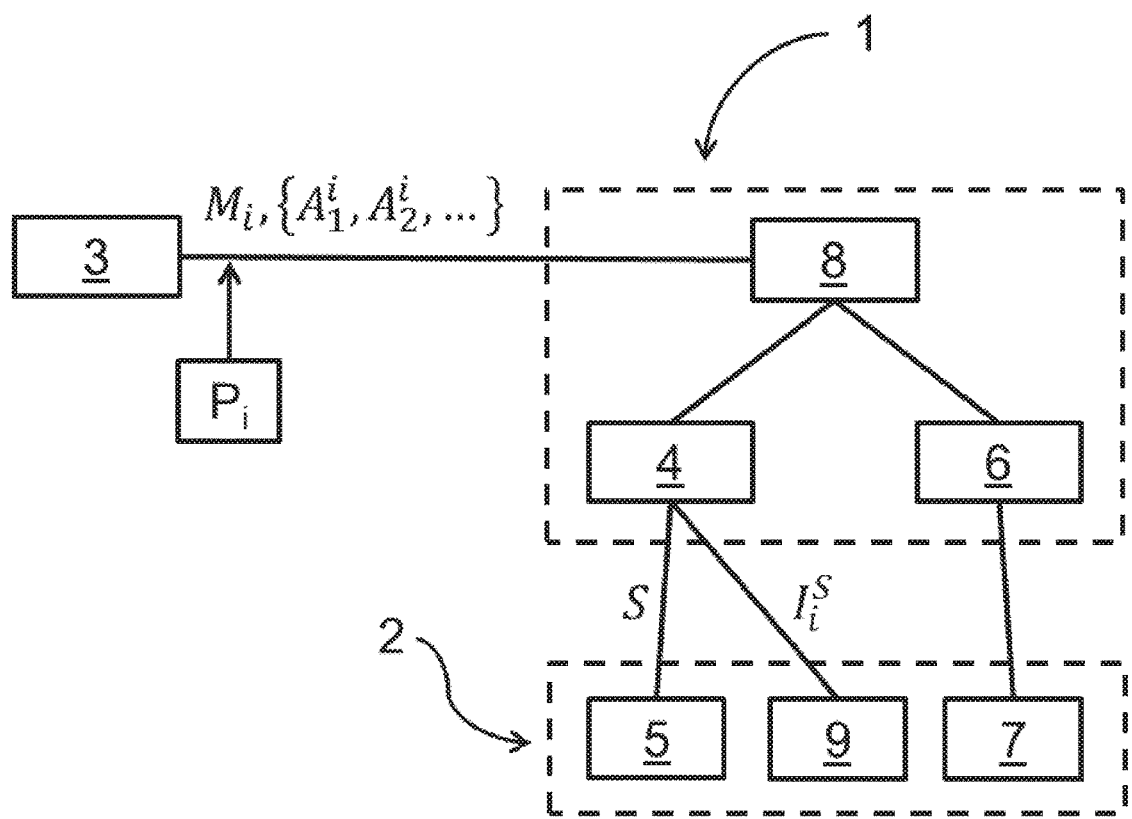
FIG. 1 shows an exemplary embodiment of the search engine according to the invention.

An exemplary embodiment of the search engine according to the invention is explained with reference to FIG. 1.

The computer program according to the invention is used to implement the exemplary embodiment and is executed on a computer which comprises the search engine 1. The search engine 1 comprises a relevance determination unit 8 which is coupled to a capture interface 4 and an output unit 6 using data technology. The relevance determination unit 8 is also coupled to a data storage unit 3 using data technology. The data storage unit 3 stores a database having data sets $M_i$ which are assigned to individual products $P_i$. In this case, the data sets $M_i$ comprise attributes $A^1_i$ to $A^n_i$ which describe, for instance, properties of the respective product $P_i$. The search engine 1 can access the data in the database and can search it.

The search engine 1 is also coupled to the user device 2 using data technology. Although FIG. 1 shows only an individual user device 2, a multiplicity of user devices 2 can be coupled to the search engine 1. The individual user device 2 comprises an input unit 5 and an interaction capture unit 9 which are coupled to the capture interface 4 of the search engine 1. The user device 2 also comprises a display unit 7 which is coupled to the output unit 6. The coupling using data technology is carried out, in particular, using a computer network such as the Internet or a local area network. In the case illustrated, the user device 2 is a personal computer, but may be any desired suitable devices, for instance a mobile telephone.

The capture unit 5 captures a search query S from a user, for instance by virtue of the latter inputting a search term to an input field on a website with the aid of a keyboard. The search query S is transmitted to the capture interface 4 of the search engine 1. The search engine 1 carries out a search and an output of search results is transmitted to the display unit 7 of the user device 2 by means of the output unit 6 and is displayed to the user. In this case, the search results are a list of data sets $M_i$ which are displayed on a website in a manner organized according to the determined relevance for the search query S.

The user can now interact with the search results, for instance by selecting individual results, calling detailed information, storing a search result in a reminder list or purchasing a product $P_i$ with the aid of a mouse or touch-screen. These interactions are captured by the interaction capture unit 9 of the user device 2 as interaction data $I^S_i$ and are transmitted to the search engine 1 via the capture interface 4.

In the case illustrated, the system according to the invention comprises the search engine 1 and the user device 2 with the interaction capture unit 9. In further exemplary embodiments, the system may alternatively or additionally comprise a checkout device as an interaction capture unit 9, for instance having a reader for customer cards for identifying a user.

An exemplary embodiment of the method according to the invention is explained with reference to FIG. 2.

The method is carried out by the search engine 1 described above with reference to FIG. 1, the computer program according to the invention being used. In a first step 101, a search query S from a user is captured. On the basis of the search query S, a database having data sets $M_i$ is searched, the data sets $M_i$ being assigned attributes $A^1_i$ to $A^n_i$. In order to carry out the search, a keyword search according to search methods known per se is used in this exemplary embodiment. However, all suitable search methods may be used, for example, a recommendation service can be used in another exemplary embodiment.

The search query S comprises, for instance, a search term, the search term "elegant" in the example illustrated. The user can select this term himself, for instance by inputting a word into a search mask on a website. However, the search query may also comprise a search option predefined to the user. For example, the user can choose a category in the case of a navigation function, the search query corresponding to the statement of the category in this case. Furthermore, it is possible to provide, for instance, a link which can be selected by the user and is used to search for seasonal offers or special offers. A plurality of the mentioned types of search queries can also be combined, for example by virtue of the user searching for seasonal offers using a search term in a particular category.

Individual products are assigned to the data sets $M_i$. A data set comprises a number of attributes $A^1_i$ to $A^n_i$ which correspond, for instance, to the fields in a table of product properties. In this case, the forms of the attributes $A^1_i$ to $A^n_i$ are different. They contain, in particular, running text or numerical information; they also contain defined forms, that is to say individual forms are gathered from a defined list, for example a number of product categories in a range or predefined color designations.

The following table I represents an example of a database having data sets $M_i$ and their attributes $A^1_i$ to $A^n_i$:

TABLE I

| $M_i$ Data sets | $A^1_i$ Identification number | $A^2_i$ Description text | $A^3_i$ Power consumption (W) | $A^4_i$ Volume (l) |
|---|---|---|---|---|
| $M_1$ | ID1 | "Elegantly shaped vacuum cleaner" | 900 | — |
| $M_2$ | ID2 | "Bagless vacuum cleaner" | 750 | — |
| $M_3$ | ID3 | "Bag for vacuum cleaner, elegant gray" | — | 2 |
| $M_4$ | ID4 | "Bag for vacuum cleaner, green" | — | 3 |
| $M_5$ | ID5 | "Elegant wedding suit" | — | — |
| $M_6$ | ID6 | "Elegant wedding dress" | — | — |
| $M_7$ | ID7 | "Wedding shoes, black" | — | — |
| $M_8$ | ID8 | "Wedding shoes, elegant shape" | — | — |

In a second step 102, the data sets $M_i$ are assigned relevance data $R^S_i$ for the captured search query S, and data sets $M_i$ are output in an output step 103. This procedure corresponds, for instance, to that of a search engine which is known per se. For example, a search term is identified in the description text of the individual data sets $M_i$. In this exemplary embodiment, the output 103 is effected in the form of the list, the ranking of which depends on the relevance data $R^S_i$. The higher the relevance determined for a data set $M_i$, the further up in the list the data set $M_i$ is displayed. In particular, only that subset of the data sets $M_i$ for which the highest relevant was determined is displayed. However, it is also possible to display all data sets $M_i$ or the output 103 may comprise a differently determined subset of the data sets $M_i$, for instance only products in stock.

The following scheme in table II illustrates, for the exemplary embodiment, the assignment 102 of the relevance data $R^S_i$ and the output step 103 in which the data sets $M_i$ are displayed as a list. In the case of the relevance data $R^S_i$, a lower value represents a higher relevance of the assigned data set $M_i$ and therefore a higher rank in the list in this simplified illustration:

TABLE II

| $M_i$ Data sets | $R^S_i$ Relevance data | | |
|---|---|---|---|
| $M_1$ | Search (S) | 1 | Output: |
| $M_2$ | "elegant" | 6 | → |
| $M_3$ | → | 4 | |
| $M_4$ | | 7 | |
| $M_5$ | | 3 | |
| $M_6$ | | 2 | |
| $M_7$ | | 8 | |
| $M_8$ | | 5 | |

1. "Elegantly shaped vacuum cleaner"
2. "Elegant wedding dress"
3. "Elegant wedding suit"
4. "Bag for vacuum cleaner, elegant gray"
5. "Wedding shoes, elegant shape"
6. "Bagless vacuum cleaner"
7. "Vacuum cleaner bag, green"
8. "Wedding shoes, black"

In this example, those data sets $M_i$ whose description text contains the search term "elegant" were assessed with high relevance. In the example, the location in the description text at which the word "elegant" (or a modification thereof) occurs was also taken into account, in which case such entries were assessed to be more relevant, the further forward the word is found. In common search methods, not all data sets are frequently output, but rather only a subset, for instance the best four results. For better illustration, however, an output with all data sets $M_i$ was selected here.

After the output step 103, the user can interact with the displayed data sets $M_i$, for example by calling details of one of the output data sets. In a step 104, interaction data $I^S_i$ which relate to these user interactions are captured. In this case, the interaction data $I^S_i$ relate, in particular, to user interactions with precisely those data sets $M_i$ which were output in response to the search query S. In this case, a user interaction is a particular interaction between the user and a technical device which can be used by the user to interact with the database.

In the example, the data sets $M_i$ are output as a list of links on a website. If the user selects a link, further information relating to the respectively assigned product is called. For example, a website containing a product description, an image and further information is displayed. The user can also reserve the product by storing it in a reminder list. He can also purchase the product. In addition to said examples of types of user interaction, any interactions between the user and the output data sets $M_i$ can also be captured as interaction data $I^S_i$. This also includes, in particular, whether the user ignores a data set $M_i$ and therefore does not interact with it.

The following scheme in table II represents the capture of the interaction data $I^S_i$ in the exemplary embodiment. The user interacts here with the displayed results by clicking on an entry in the output list and therefore calling information relating to the respective data set $M_i$ or by purchasing a product. The values 0 (no interactions) and 1 (interactions were carried out) are captured as interaction data $I^S_i$. The frequency of the user interactions is therefore illustrated in a simplified manner here. For example, after a search with the search term "elegant", the users only click on the wedding suit $M_5$ and the wedding dress $M_6$:

TABLE III

| $M_i$ Data sets | $I^S_i$ Interaction data |
|---|---|
| $M_1$ | Interaction data 0 |
| $M_2$ | (yes/no = 1/0) 0 |
| $M_3$ | → 0 |
| $M_4$ | 0 |
| $M_5$ | 1 |
| $M_6$ | 1 |
| $M_7$ | 0 |
| $M_8$ | 0 |

The interaction data $I^S_i$ are captured, in particular, for user interactions by a multiplicity of users. However, in each of these cases, the respective user interacts with data sets $M_i$ from a list which was output to him in response to the same search query S. The interaction data $I^S_i$ therefore always relate to the search query S.

In a further step 105, correlation data $K^{S,1}$ to $K^{S,n}$ which indicate correlations between the individual attributes $A^1_i$ to $A^n_i$ and the interaction data $I^S_i$ for the search query S are now determined. In particular, this step determines whether particular forms of the attributes $A^1_i$ to $A^n_i$ have a positive or negative correlation with the interaction data $I^S_i$.

When assessing the interaction data $I^S_i$, it is possible to consider, for example, the frequency of the user interactions as an important feature. In this case, the interaction data $I^S_i$ can be weighted in such a manner that data sets $M_i$ for which a high interaction frequency has been captured are assessed as more relevant. Conversely, a low interaction frequency indicates low relevance. Furthermore, a weighting can be carried out according to the type of user interaction. For example, the purchases of a product may have a greater influence on the relevance of the assigned data set $M_i$ than the mere calling of information.

In this manner, the influence of the individual attributes $A^1_i$ to $A^n_i$ on the interaction data $I^S_i$ is considered and correlation data $K^{S,1}$ to $K^{S,n}$ are determined, which correlation data state, for instance, in the present example: "For the search query 'elegant', the word 'wedding' in the attribute $A^2$ (description) has a positive correlation with the clicking probability; in the fields $A^3$ (power consumption) and $A^4$ (volume), an empty entry has a positive correlation with the clicking probability." These correlation data $K^{S,1}$ to $K^{S,n}$ are stored as a matrix in the present case.

Since the clicking probability is considered to be a measure of the relevance of the data sets $M_i$ for the search query S, the relevance data $R^S_i$ of the data sets $M_i$ can now be determined in such a manner that they better correspond to the actually captured interaction data $I^S_i$. For this purpose, relevance data $R^S_i$ for the data sets $M_i$ are generated again in a further step 106 with the inclusion of the correlation data $K^{S,1}$ to $K^{S,n}$. The new relevance data $R^S_i$—and therefore the new ranking in the output list—are determined on the basis of the attributes $A^1_i$ to $A^n_i$ of the data sets $M_i$ and with the inclusion of the correlation data $K^{S,1}$ to $K^{S,n}$.

If a new search with the search term "elegant" is now carried out in the exemplary embodiment, the list of search results cited in table IV below results:

TABLE IV

| $M_i$ Data sets | | (new) $R^S_i$ relevance data | |
|---|---|---|---|
| $M_1$ | Search (S) | 5 | Output: |
| $M_2$ | "elegant" | 8 | → |
| $M_3$ | → | 6 | |
| $M_4$ | | 7 | |
| $M_5$ | | 1 | |
| $M_6$ | | 2 | |
| $M_7$ | | 4 | |
| $M_8$ | | 3 | |

1. "Elegant wedding suit"
2. "Elegant wedding dress"
3. "Wedding shoes, elegant shape"
4. "Wedding shoes, black"
5. "Elegantly shaped vacuum cleaner"
6. "Bag for vacuum cleaner, elegant gray"
7. "Vacuum cleaner bag, green"
8. "Bagless vacuum cleaner"

In this case, the "wedding shoes, elegant shape" which were previously listed further down move further up, even though there was no interaction with this product in response to this search query. This happens because the word "wedding" was found in the description text and the fields "power consumption" and "volume" are empty, which has a positive correlation with the clicking probability. Furthermore, the product "wedding shoes, black" moves up even though it does not contain the word "elegant" and was therefore originally assessed as not very relevant. Data sets can therefore be assessed with higher relevance without interactions with precisely these data sets being required. It is sufficient that user interactions with other products having similar attributes have been captured. These interactions are then generalized.

In a further exemplary embodiment, the user searches the database, which is illustrated in the example above and has the data sets $M_i$, on the basis of a new search query S with the search term "bag". During the search, the product "Bagless vacuum cleaner" ($M_2$) is displayed above the actual bags because the search term is included in the description text. If interactions with the product "Bag for vacuum cleaner, elegant gray" ($M_3$) are increasingly captured after the search, not only the data set $M_3$ but also the data set $M_4$ ("Bag for vacuum cleaner, green") move up in the list. The correlation data comprise, for example, information relating to the fact that, in the search query S "bag", a high interaction probability is correlated with the fact that the field "volume" is not empty, whereas the field "power consumption" is empty.

In a further exemplary embodiment, a further search is carried out with a further search query S' which comprises an incorrectly written search term, here the word "ellegant". According to the invention, the interaction data $I^{S'}_i$ for this further search query S' are assigned to the incorrectly written search term, that is to say the word "ellegant" in this case. Misspellings typically occur with considerably less frequency than the correctly written terms. That is to say, fewer interaction data items $I^{S'}_i$ are typically captured for the misspelling than for the correctly written term.

In order to nevertheless have the largest possible volume of data available for determining further relevance data $R^{S'}_i$ for the further search query S', a degree of similarity $\alpha_{S,S'}$ between the search query S and the further search query S' can be determined. Various methods are available for determining the degree of similarity $\alpha_{S,S'}$. For example, the order of a plurality of search terms can be considered, typical misspellings can be identified or search queries may have slight differences. In particular, a semantic similarity of the search queries S can be determined. Similar terms may be determined, for instance, in a thesaurus or a translation dictionary, according to a word stem method such as stemming or lemmatization, by means of phonetic similarities or by means of similarity methods such as the Levenshtein distance or a method described in EP 2 035 965 B1. In particular, this allows quantification of the degree of similarity $\alpha_{S,S'}$ of the search terms to one another.

With sufficient similarity $\alpha_{S,S'}$, the interaction data $I^S_i$ for the search query S are now also taken into account for the further search query S'. The relevance data $R^{S'}_i$ for S' can therefore be determined in a more accurate manner for the data sets $M_i$.

Conversely, the interaction data $I^{S'}_i$ for the further search query S' with the incorrectly written search term are also taken into account for the search query S given sufficient similarity $\alpha_{S,S'}$. The interaction data $I^S_i$ for the search query S are therefore supplemented with the interaction data $I^{S'}_i$ for the further search query S' in order to determine the relevance data $R^S_i$.

In particular, the interaction data $I^S_i$ for the search query S and the further interaction data $I^{S'}_i$ for the further search query S' are weighted on the basis of the degree of similarity $\alpha_{S,S'}$, with the result that search queries S which are more similar to one another have a greater influence on one another than search queries which are less similar.

In a similar manner to this example, the method according to the invention can also process other search queries, in particular search queries which rarely occur, even if there is no misspelling, for instance if a plurality of terms occur in a different order or synonymous search terms are used.

In another exemplary embodiment, a hit list is first of all determined after the search query S with the search term "elegant" has been captured. That is to say, the relevance data $R^S_i$ initially do not indicate a quantitative relevance, but rather it is only determined whether individual data sets are relevant. In particular, the database is searched here for the search term "elegant", in which case misspellings and grammatical forms of the term are taken into account.

The data sets in the hit list are first of all output in this case in a list organized according to the price. The ranking can also be carried out according to other criteria. The ranking therefore does not reflect any differences in the relevance of the products. The following table V illustrates this, in which case the values of the relevance data $R^S_i$ are displayed as "relevant" (1) or "not relevant" (0):

TABLE V

| $M_i$ Data sets | $R^S_i$ Relevance data | | |
|---|---|---|---|
| $M_1$ | Search (S) | 1 | Output of the hit list: |
| $M_2$ | "elegant" | 0 | |
| $M_3$ | → | 1 | → |
| $M_4$ | | 0 | |
| $M_5$ | | 1 | |
| $M_6$ | | 1 | |
| $M_7$ | | 0 | |
| $M_8$ | | 1 | |

1. "Elegantly shaped vacuum cleaner"
2. "Elegant wedding dress"
3. "Elegant wedding suit"
4. "Wedding shoes, elegant form"
5. "Bag for vacuum cleaner, elegant gray"

The data sets $M_2$, $M_4$, and $M_7$ are missing in the hit list since they do not contain the word "elegant". For this reason, the user can interact only with the displayed data sets $M_i$. For example, after a search with the search term "elegant", only the wedding suit $M_5$ and the wedding dress $M_6$ are clicked on, as illustrated in table VI:

TABLE VI

| $M_i$ Data sets | $I^S_i$ Interaction data | |
|---|---|---|
| $M_1$ | Interaction data | 0 |
| $M_2$ | (yes/no = 1/0) | 0 |
| $M_3$ | → | 0 |
| $M_4$ | | 0 |
| $M_5$ | | 1 |
| $M_6$ | | 1 |
| $M_7$ | | 0 |
| $M_8$ | | 0 |

As already described above, correlation data $K^{S,1}$ to $K^{S,n}$ are now determined and reveal that the word "wedding" has a positive correlation with the clicking probability. The relevance data $R^S_i$ are accordingly adapted. A relevance is now quantitatively determined and the data sets $M_i$ are output in an order organized according to relevance. This is illustrated in table VII:

TABLE VII

| $M_i$ Data sets | (new) $R^S_i$ relevance data | |
|---|---|---|
| $M_1$ | Search (S) | 4 | Output: |
| $M_2$ | "elegant" | — | → |
| $M_3$ | → | 5 | |
| $M_4$ | | — | |
| $M_5$ | | 1 | |
| $M_6$ | | 2 | |

TABLE VII-continued

| $M_i$ Data sets | (new) $R^S_i$ relevance data |
|---|---|
| $M_7$ | 3 |
| $M_8$ | — |

1. "Elegant wedding suit"
2. "Elegant wedding dress"
3. "Wedding shoes, elegant shape"
4. "Elegantly shaped vacuum cleaner"
5. "Bag for vacuum cleaner, elegant gray"

It should be noted in this case that quantitative relevance data are determined only for the data sets $M_i$ which are contained in the hit list (see table V). This restricts the quantity of data sets $M_i$ to be processed, with the result that the required computing power for assigning the new relevance data $R^S_i$ is reduced. In contrast to the exemplary embodiment shown above (see table IV), however, the "wedding shoes, black" $M_7$ are not taken into account since they do not contain the search word "elegant" and already were not taken into account when determining the hit list illustrated in table V.

The determination of differences between expected interaction data and actual interaction data is explained with reference to FIGS. 2 and 3.

Figure 2:
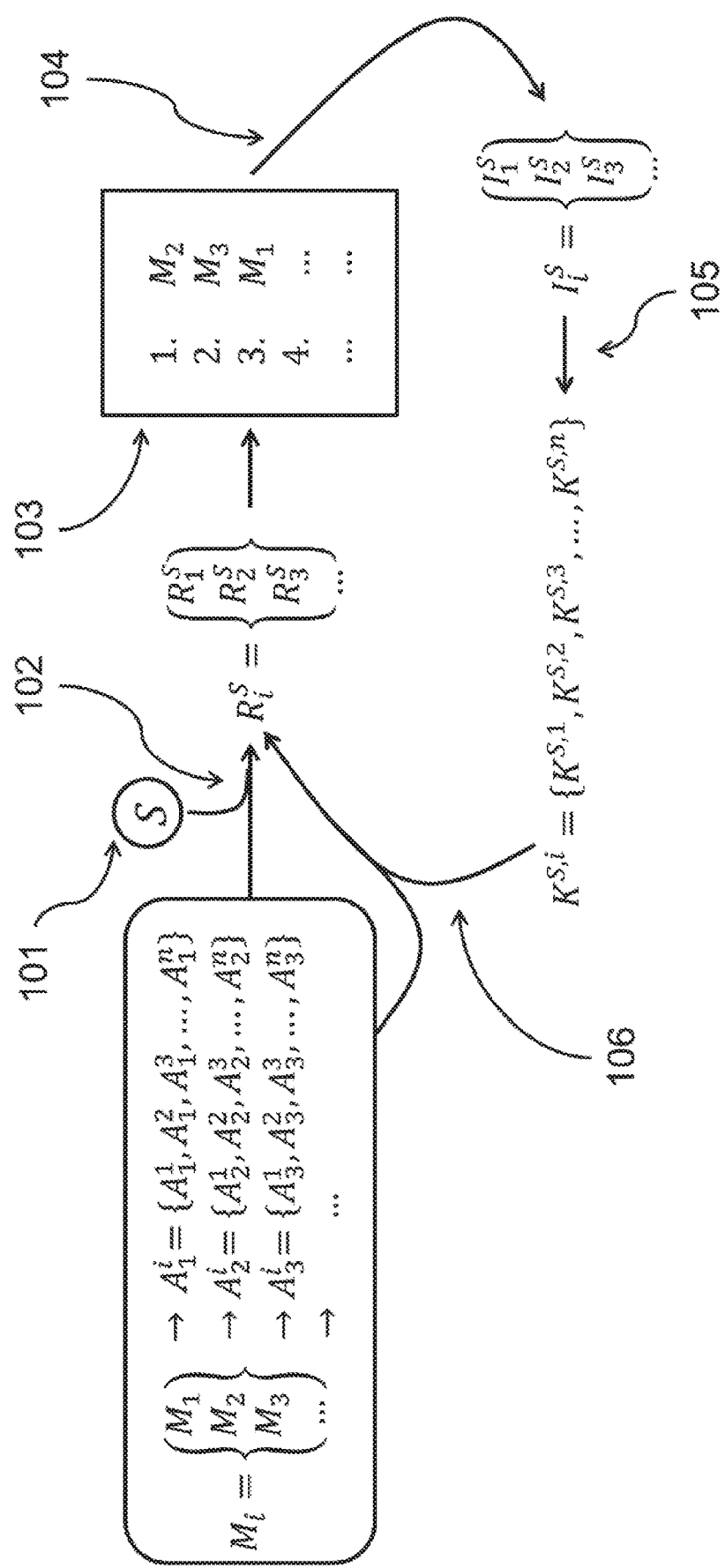
FIG. 2 shows an exemplary embodiment of the method according to the invention.
Figure 3:
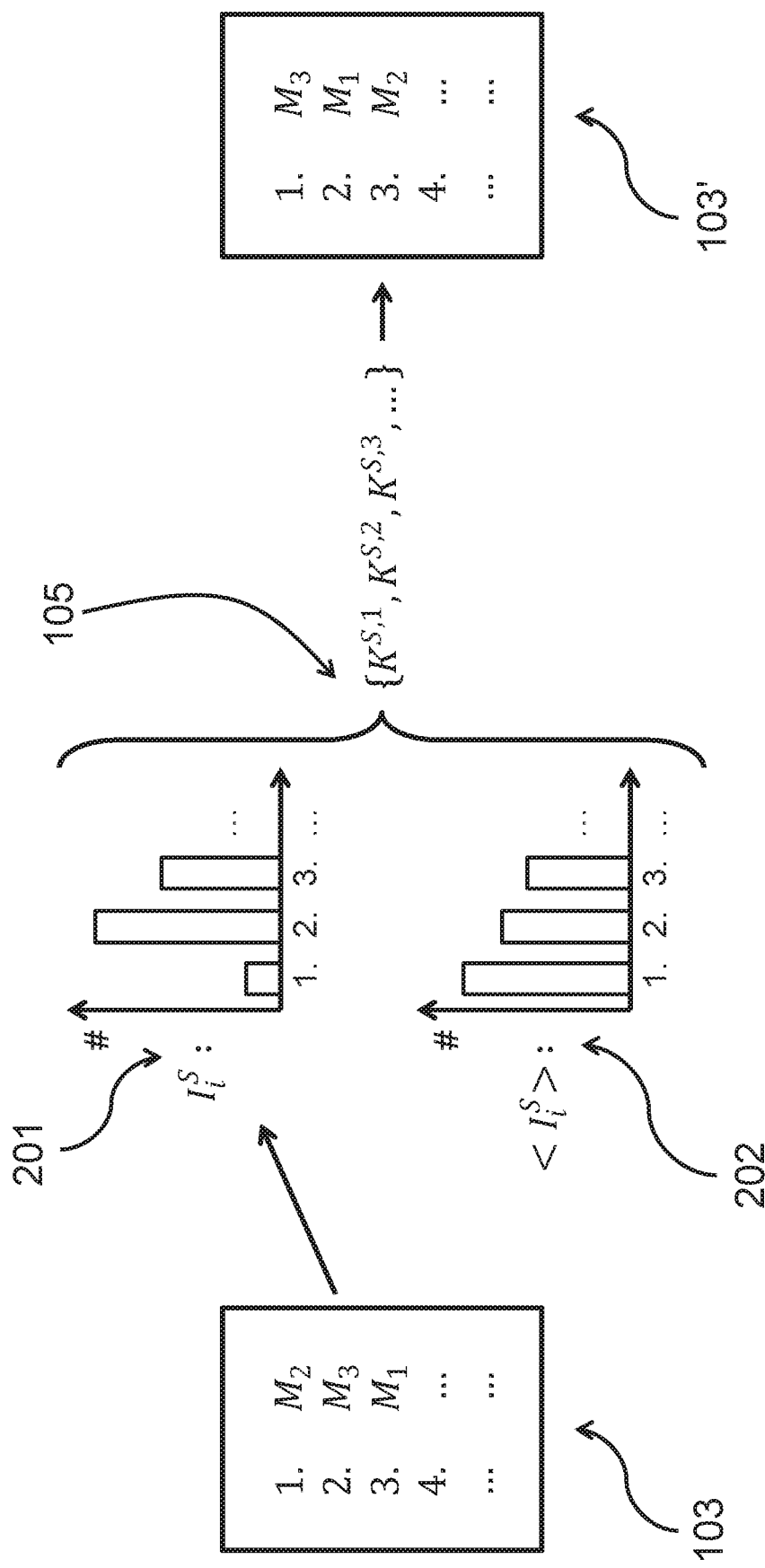
FIG. 3 shows the determination of differences between expected interaction data and actual interaction data.

The example illustrated in FIG. 2 is taken as a basis: on the basis of a search query S, data sets $M_i$ were output to the user in an output step 103. The user interacts with these data sets $M_i$. In this example, the user calls up detailed information relating to individual data sets $M_i$ by clicking on a website. This is captured in the actual interaction data $I^S_i$ which are illustrated in FIG. 3 as the "actual graph" 201. In this case, the frequency of the clicks is plotted along the ordinate axis and the placement of the respective data set in the list output in step 103 is plotted along the abscissa axis. These actual interaction data $I^S_i$ are compared with expected interaction data $<I^S_i>$ which are illustrated as the "expected graph" 202 in a similar manner to the actual graph 201.

It is shown that, according to the expected interaction data $<I^S_i>$, it is expected that more clicks for the data sets will take place, the higher the data sets are placed in the list. However, a comparison with the actual interaction data $I^S_i$ shows that this is not the case, but rather that the first entry was clicked fewer times than the two following entries. This information can be used in the subsequent step 105 to determine the correlation data $K^{S,1}$ to $K^{S,n}$. For example, for the expected interaction data $<I^S_i>$, it is possible to predefine a target distribution in which highly placed entries, for instance, are clicked more often. The generation of new relevance data $R^S_i$ for the data sets $M_i$ then results in corresponding resorting of the search results which can be output again in a new output 103'.

In another exemplary embodiment, the user is identified, for example by logging onto a website of a web shop. This user identification is used to supplement the user interactions and for the search; for example, information such as age and sex can be captured. This allows further adaptation of the relevance data $R^S_i$, for instance to a target group for which particularly relevant search results are intended to be output.

In the exemplary embodiment described above, the input unit 5, the display unit 7 and the interaction capture unit 9 are included in a single user device 2, for example a personal computer or mobile telephone. In another embodiment, these units are implemented individually or a plurality of said units are implemented in different devices. In this case, physical user interactions, in particular, can be captured, for example in a shop or at a trade show.

For example, at least the input unit 5 and the display unit 7 are integrated in a device, for instance in an application on a mobile telephone, and an interaction capture unit 9 is arranged separately therefrom, for instance on a cash register of the shop. In this example, the user uses his mobile telephone to carry out a search with a search query S. For example, the user can search for a search term or can call up the daily offers. A list of products $P_i$ is displayed to the user and the latter can have an output of, for instance, detailed information relating to individual products $P_i$ or can have a display of the route to the product $P_i$. If the user purchases one of the displayed products $P_i$, the cash register of the shop captures this user interaction. If the user is identified in this operation, for instance by means of a login, a credit card or a customer card, the purchase captured by the cash register can be assigned to the interaction data $I^S_i$ for the search query S queried on the mobile telephone. In this case, the interaction data $I^S_i$ comprise interactions both by the mobile telephone and by the purchasing process with the physical goods.

Instead of the mobile telephone, a terminal computer, for instance, in the shop may also be used or the user may ask a seller for information. In order to capture physical user interactions, transponders, for instance, may be fitted to the products $P_i$, in particular to their packaging, but the user can also carry a transponder with him, for example in the form of a suitable user device 2 or a transponder in a customer or credit card or on a shopping cart. Such a transponder assigned to the user may be read, for instance, by devices on the premises in order to capture the position of the user, for instance in front of the shelf containing the product $P_i$, or his interactions with products $P_i$.

Physical user interactions can also be captured by means of other devices, for instance by means of a camera system or data glasses belonging to the user which capture, for instance, where the user is situated, whether the user takes a product $P_i$ from the shelf, places it in the shopping cart or purchases it. Such a system may also identify the user or capture what products $P_i$ are viewed by the user. The camera system may be fitted in the shop, for instance, or may be mobile, for example in the form of a camera in data glasses belonging to the user. Furthermore, a checkout device may capture purchasing operations as user interactions and may transmit them to the capture interface 4.

The important factor in this case is that the user interactions with the products $P_i$ can be assigned to the results of the search with the search query S. This can be implemented, in particular, by means of a login of the user.

REFERENCE SIGNS $M_i$ Data sets
$P_i$ Products
$A^1_i$ to $A^n_i$ Attributes
S Search query
S' Further search query
$R^S_i$ Relevance data
$R^{S'}_i$ Further relevance data
$I^S_i$ Interaction data
$I^{S'}_i$ Further interaction data
$K^{S,1}$ to $K^{S,n}$ Correlation data
$K^{S',1}$ to $K^{S',n}$ Further correlation data
$\alpha_{S,S'}$ Degree of similarity
1 Search engine
2 User device
3 Data storage unit
4 Capture interface of the search engine
5 Input unit
6 Output unit of the search engine
7 Display unit
8 Relevance determination unit
9 Interaction capture unit
101 Capture of a search query
102 Assignment of relevance data
103 Output of data sets
103' Renewed output of data sets
104 Capture of interaction data
105 Determination of correlation data
106 Renewed generation of relevance data
201 Actual graph of the interaction data
202 Expected graph of the interaction data Having described the invention, the following is claimed:

1. A method for searching a database having data sets ($M_i$), the data sets ($M_i$) comprising attributes ($A^1_i$ to $A^n_i$), comprising:
    capturing a search query (S),
    assigning the data sets ($M_i$) relevance data ($R^S_i$) for the search query (S),
    outputting at least one subset of the data sets ($M_i$) on the basis of the relevance data $R^S_i$,
    capturing interaction data $I^S_i$ by means of user interactions with the data sets ($M_i$) output for the search query (S),
    determining correlation data ($K^{S,1}$ to $K^{S,n}$) and indicating the correlation between the individual attributes ($A^1_i$ to $A^n_i$) and the interaction data ($I^S_i$) for the search query (S), wherein determining correlation data includes i) using differences between expected interaction data ($<I^S_i>$) and actual interaction data $I^S_i$ to predefine a target distribution of the expected interaction data, and ii) only considering attributes that occur in actual interaction data of several interactions, and
    generating again the relevance data ($R^S_i$) of the data sets ($M_i$) for the search query (S) with the inclusion of the correlation data ($K^{S,1}$ to $K^{S,n}$) and the attributes ($A^1_i$ to $A^n_i$) of the data sets ($M_i$).

2. The method as claimed in claim 1, wherein the search query (S) comprises at least one search term (S1).

3. The method as claimed in claim 1, wherein the search query (S) comprises a selection of at least one search option predefined to the user.

4. The method as claimed in claim 1, wherein the relevance data ($R^S_i$) of the data sets ($M_i$) for the search query (S) are generated on the basis of a recommendation service.

5. The method as claimed in claim 1, wherein the correlation data ($K^{S,1}$ to $K^{S,n}$) are also determined on the basis of further interaction data ($I^{S'}_i$), the further interaction data ($I^{S'}_i$) relating to user interactions with the data sets ($M_i$) output for a further search query (S'), the further search query (S') having at least a predefined degree of similarity ($\alpha_{S,S'}$) to the search query(S).

6. The method as claimed in claim 1, wherein the data sets ($M_i$) in the subset are organized during output according to a ranking which depends on the relevance data $R^S_i$.

7. The method as claimed in claim 1, wherein the user interactions comprise a call for information relating to the data sets ($M_i$) and/or reserving and/or purchasing products ($P_i$) assigned to the data sets ($M_i$).

8. The method as claimed in claim 1, wherein the interaction data ($I^S_i$) are weighted according to the type of user interactions when determining the correlation data ($K^{S,1}$ to $K^{S,n}$).

9. The method as claimed in claim 1, wherein the user interactions are weighted on the basis of their frequency when determining the correlation data ($K^{S,1}$ to $K^{S,n}$).

10. The method as claimed in claim 1, wherein the attributes ($A^1_i$, $A^n_i$) comprise running text, numerical information and/or defined forms of products ($P_i$) assigned to the data sets ($M_i$).

11. The method as claimed in claim 1, wherein a user identification is carried out in conjunction with the user interactions and the search is also carried out on the basis of data relating to the user.

12. The method as claimed in claim 1, wherein generating again the relevance data comprises taking into account a user physically interacting with a product.

13. A non-transitory computer readable medium comprising a computer program having program code for carrying out the following method when the program code is executed by a computer:
capturing a search query (S),
assigning the data sets ($M_i$) relevance data ($R^S_i$) for the search query (S),
outputting at least one subset of the data sets $M_i$ on the basis of the relevance data ($R^S_i$),
capturing interaction data ($I^S_i$) by means of user interactions with the data sets ($M_i$) output for the search query (S),
determining correlation data ($K^{S,1}$ to $K^{S,n}$) and indicating the correlation between the individual attributes ($A^1_i$ to $A^n_i$) and the interaction data ($I^S_i$) for the search query (S), wherein determining correlation data includes using ($I^S_i$ between expected interaction data ($<I^S_i>$) and actual interaction data ($I^S_i$) to predefine a target distribution of the expected interaction data, and ii) only considering attributes that occur in actual interaction data of several interactions, and
generating again the relevance data ($R^S_i$) of the data sets ($M_i$) for the search query (S) with the inclusion of the correlation data ($K^{S,1}$ to $K^{S,n}$) and the attributes ($A^1_i$ to $A^n_i$) of the data sets ($M_i$).

14. A search engine for searching a database which is stored on a data storage unit and has data sets ($M_i$), the data sets ($M_i$) comprising attributes ($A^1_i$ to $A^n_i$), said search engine comprising:
a capture interface for capturing a search query (S),
a relevance determination unit for assigning relevance data ($R^S_i$) for the search query (S) to the data sets ($M_i$), and
an output unit for outputting at least one subset of the data sets ($M_i$) on the basis of the relevance data ($R^S_i$),
wherein
the capture interface configured to capture interaction data ($I^S_i$) by means of user interactions with the data sets ($M_i$) output for the search query (S),
the relevance determination unit configured to determine correlation data ($K^{S,1}$ to $K^{S,n}$) which indicate the correlation between the individual attributes ($A^1_i$ to $A^n_i$) and the interaction data ($I^S_i$) for the search query (S), wherein when determining the correlation data ($K^{S,1}$ to $K^{S,n}$) differences between expected interaction data ($<I^S_i>$) and actual interaction data ($I^S_i$) are used to predefine a target distribution of the expected interaction data, and only attributes that occur in actual interaction data of several interactions are considered to determine the correlation data, and
the relevance data ($R^S_i$) of the data sets ($M_i$) for the search query (S) generated again with the inclusion of the correlation data ($K^{S,1}$ to $K^{S,n}$) and the attributes ($A^1_i$ to $A^n_i$) of the data sets ($M_i$).

15. The search engine as claimed in claim 14, wherein a spatial proximity between the user and products ($P_i$), assigned to the data sets ($M_i$) captured during the user interactions by the capture interface.

16. The search engine as claimed in claim 15, wherein viewing of the products ($P_i$) assigned to the data sets ($M_i$) by a user and/or movement of the products ($P_i$) is captured during the user interactions by the capture interface.

17. The search engine as claimed in claim 14, wherein a user identification is carried out by a checkout device and the correlation data ($K^{S,1}$ to $K^{S,n}$) is determined on the basis of the user identification.

18. The search engine as claimed in claim 15, wherein signals between the products ($P_i$) and a device assigned to a user are transmitted by means of at least one transponder during the user interactions captured by the capture interface.

19. The search engine as claimed in claim 14, wherein the user interactions captured by the capture interface comprise physical and virtual interactions between a user and products ($P_i$).

20. A system comprising:
a search engine for searching a database which is stored on a data storage unit and has data sets ($M_i$), the data sets ($M_i$) comprising attributes ($A^1_i$ to $A^n_i$), said search engine comprising:
a capture interface for capturing a search query (S),
a relevance determination unit for assigning relevance data ($R^S_i$) for the search query (S) to the data sets ($M_i$), and
an output unit for outputting at least one subset of the data sets ($M_i$) on the basis of the relevance data ($R^S_i$),
wherein
the capture interface configured to capture interaction data ($I^S_i$) by means of user interactions with the data sets ($M_i$) output for the search query (S),
the relevance determination unit configured to determine correlation data ($K^{S,1}$ to $K^{S,n}$) which indicate the correlation between the individual attributes ($A^1_i$ to $A^n_i$) and the interaction data ($I^S_i$) for the search query (S), wherein when determining the correlation data ($K^{S,1}$ to $K^{S,n}$) differences between expected interaction data ($<I^S_i>$) and actual interaction data ($I^S_i$) are used to predefine a target distribution of the expected interaction data, and only attributes that occur in actual interaction data of several interactions are considered to determine the correlation data, and
the relevance data ($R^S_i$) of the data sets for the search query (S) generated again with the inclusion of the correlation data ($K^{S,1}$ to $K^{S,n}$) and the attributes ($A^1_i$ to $A^n_i$) of the data sets ($M_i$),
an interaction capture unit for capturing interactions between a user and products ($P_i$), and
a data connection established between the interaction capture unit and the capture interface, wherein data relating to the captured interactions is transmitted from the interaction capture unit to the capture interface of the search engine.

* * * * *